(12) United States Patent
Schindler et al.

(10) Patent No.: US 9,574,675 B2
(45) Date of Patent: Feb. 21, 2017

(54) VENT VALVE

(71) Applicant: Veritas AG, Gelnhausen (DE)

(72) Inventors: Thomas Schindler, Hösbach (DE); Alexander Emmerling, Mainz (DE)

(73) Assignee: Veritas AG, Gelnhausen (DE)

( * ) Notice: Subject to any disclaimer, the term of this patent is extended or adjusted under 35 U.S.C. 154(b) by 0 days.

(21) Appl. No.: 14/539,686

(22) Filed: Nov. 12, 2014

(65) Prior Publication Data

US 2015/0129051 A1 May 14, 2015

(30) Foreign Application Priority Data

Nov. 12, 2013 (DE) .......................... 10 2013 112 407

(51) Int. Cl.
*F16K 24/04* (2006.01)
*B60K 15/035* (2006.01)
*F16K 31/20* (2006.01)

(52) U.S. Cl.
CPC ........... *F16K 24/042* (2013.01); *B60K 15/035* (2013.01); *F16K 31/20* (2013.01); *Y10T 137/3099* (2015.04)

(58) Field of Classification Search
CPC ........... Y10T 137/053; Y10T 137/0753; Y10T 137/0777; Y10T 137/0874; Y10T 137/3099; Y10T 137/6004; Y10T 137/7358; Y10T 137/7423; Y10T 137/86324; Y10T 137/86332; F16K 24/042; F16K 31/20; B60K 15/035; F24D 19/081
USPC ............. 137/43, 202, 39, 38, 315.08, 15.26, 587,137/588, 409, 423, 429; 141/59, 198, 202, 229; 123/516, 518, 198 D, 520; 220/86.2
See application file for complete search history.

(56) References Cited

U.S. PATENT DOCUMENTS

| | | | | |
|---|---|---|---|---|
| 462,845 A * | 11/1891 | MArsh | ................ | F24D 19/081 137/202 |
| 950,627 A * | 3/1910 | Sauer | ................... | F24D 19/081 137/202 |
| 3,321,972 A * | 5/1967 | Goldtrap | ................. | E03D 1/33 137/414 |
| 4,209,032 A * | 6/1980 | Drori | ................... | F16K 24/042 137/202 |
| 4,342,329 A * | 8/1982 | Roff | ............................ | 137/202 |
| 5,582,198 A | 12/1996 | Nagino et al. | | |
| 6,508,263 B1 | 1/2003 | Jahnke et al. | | |
| 7,571,740 B2 * | 8/2009 | Kaneko et al. | .............. | 137/202 |
| 2004/0055638 A1* | 3/2004 | Yamada et al. | .............. | 137/202 |
| 2004/0134532 A1* | 7/2004 | Yamada et al. | .............. | 137/202 |
| 2006/0213555 A1* | 9/2006 | Miura et al. | .................. | 137/202 |
| 2009/0071543 A1* | 3/2009 | Vulkan et al. | ............. | 137/15.26 |
| 2010/0224265 A1* | 9/2010 | Kobayashi et al. | ......... | 137/202 |

FOREIGN PATENT DOCUMENTS

| DE | 197 07 841 A1 | 10/1997 |
|---|---|---|
| EP | 1 203 685 A1 | 5/2002 |
| EP | 2 008 857 B1 | 3/2010 |

OTHER PUBLICATIONS

European Search Report of Application No. 14192133.8-1752 dated Mar. 17, 2015.

* cited by examiner

*Primary Examiner* — Craig J Price
(74) *Attorney, Agent, or Firm* — Wiggin and Dana LLP; Gregory S. Rosenblatt; Jonathan D. Hall

(57) ABSTRACT

The present invention relates to a vent valve with a vent opening for venting a liquid tank in a motor vehicle, with a float in a float chamber for closing the vent opening; and a plurality of guide ribs for guiding the float in the float chamber, which guide ribs are formed by a housing of the float chamber and protrude into the interior of the float chamber.

3 Claims, 6 Drawing Sheets

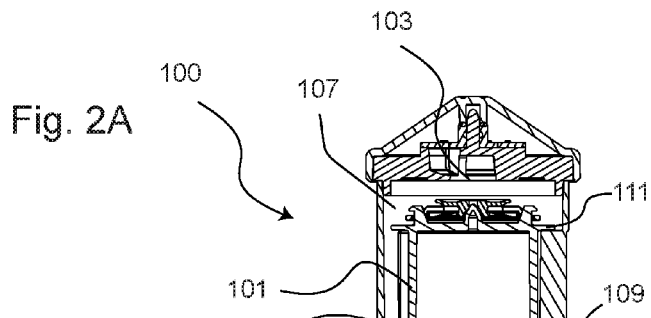
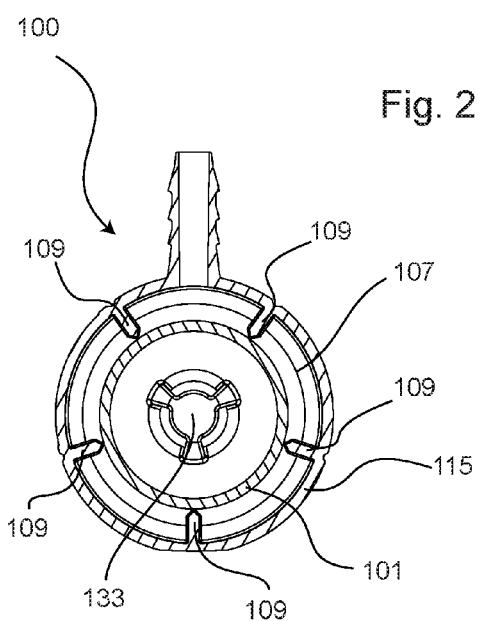
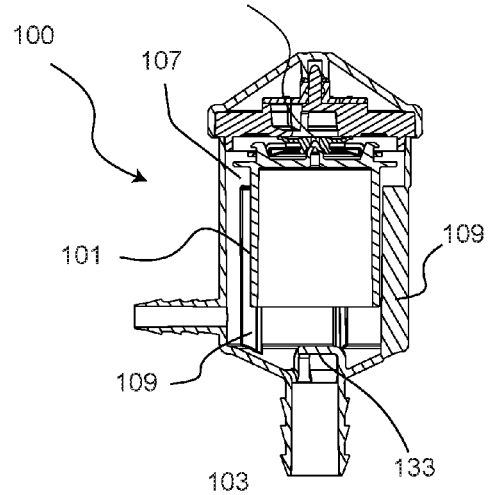
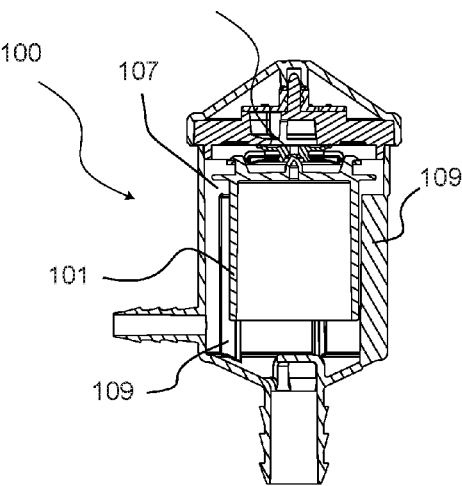

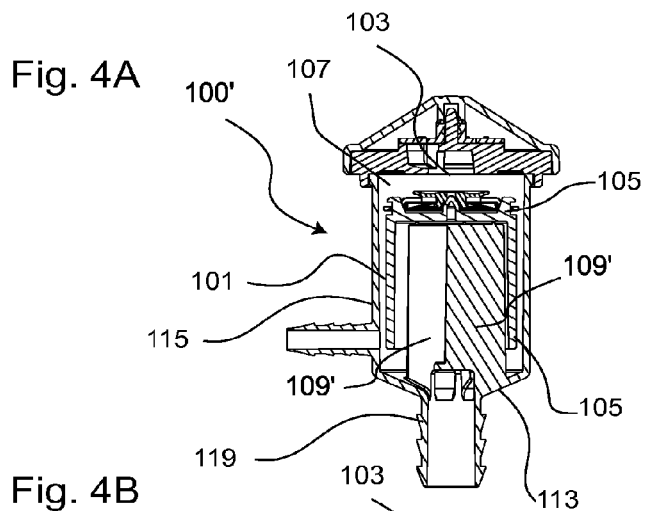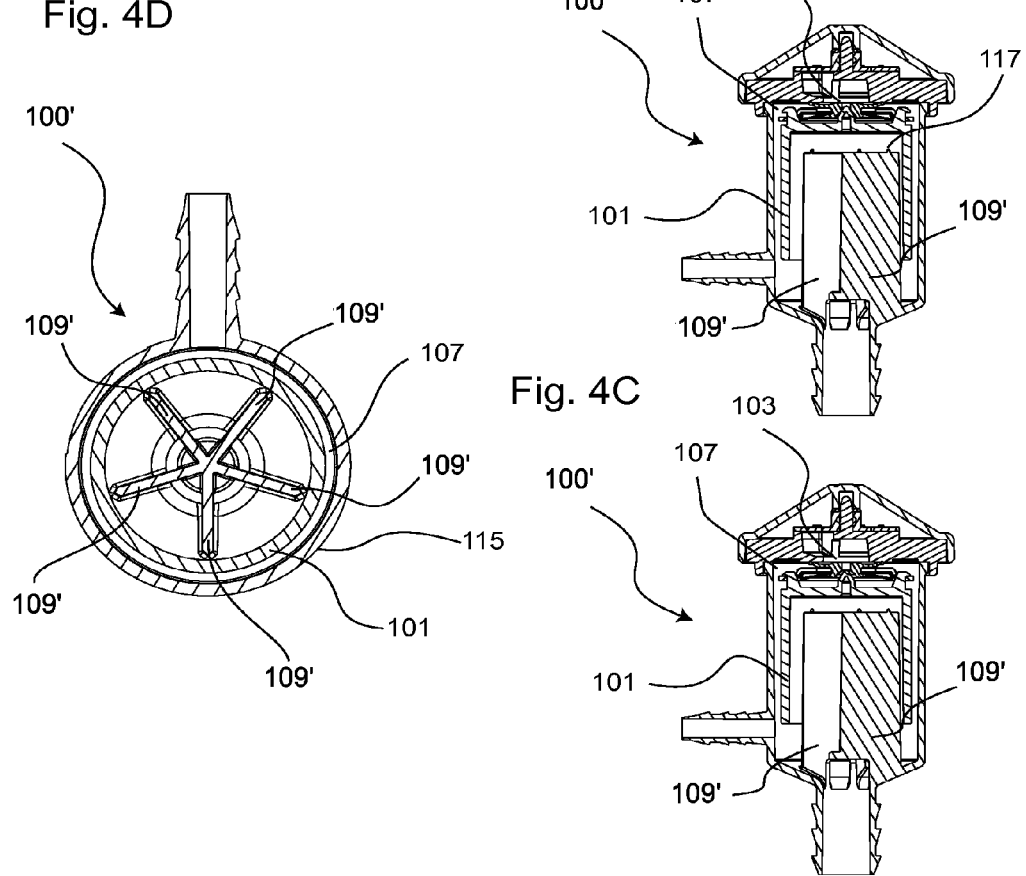

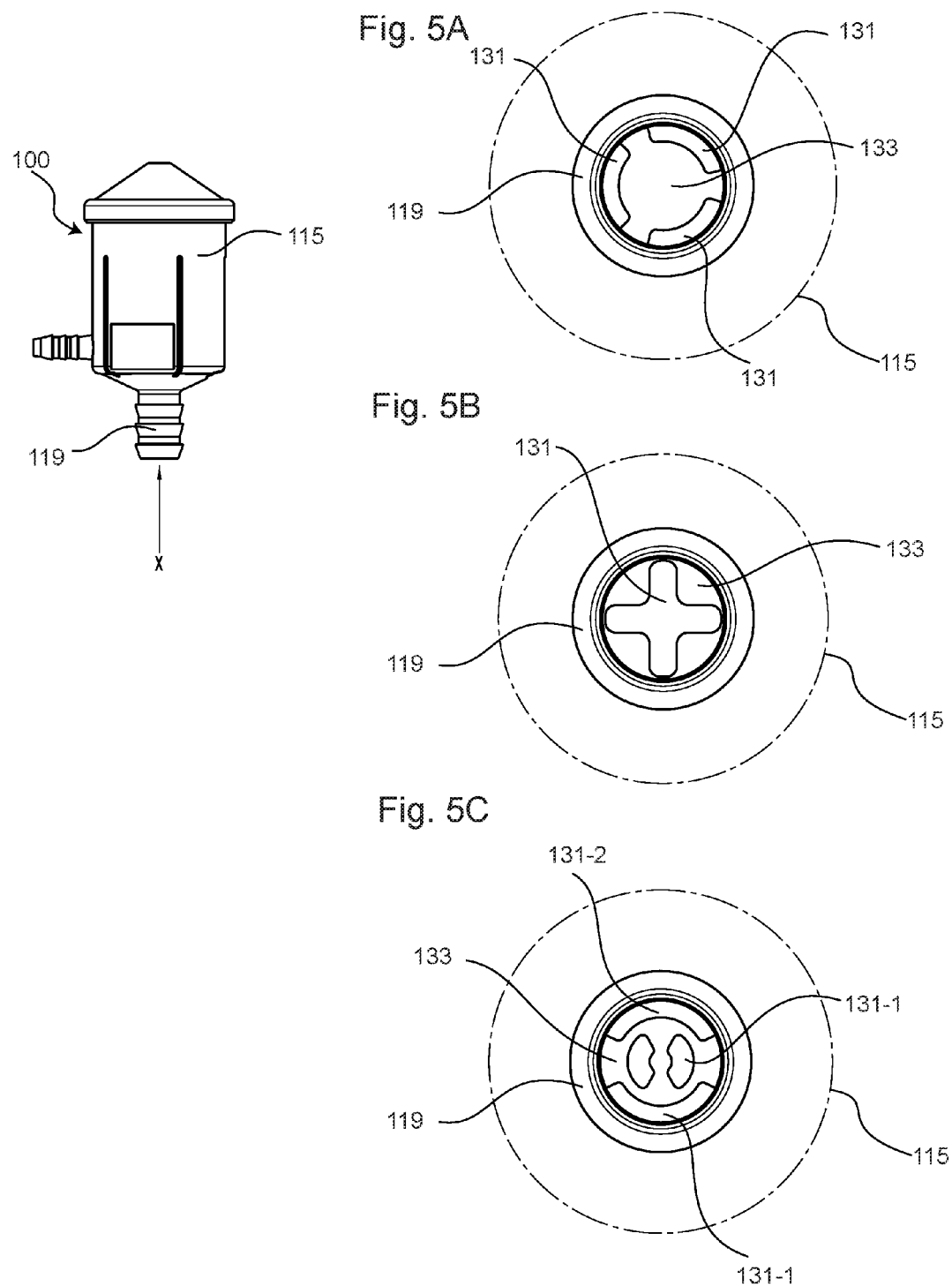

VENT VALVE

CROSS REFERENCE TO RELATED APPLICATION

This application claims priority to German Patent Application No. 10 2013 112 407.0 filed on Nov. 12, 2013. The disclosure of German Patent Application No. 10 2013 112 407.0 is hereby incorporated by reference herein in its entirety.

FIELD OF THE DISCLOSURE

The present invention relates to a vent valve for venting a liquid tank in a motor vehicle.

BACKGROUND

During the refilling of a liquid tank, the air in the interior of the liquid tank is displaced by the liquid inserted therein. In order to remove the displaced air from the liquid tank, use is made of special vent valves. Vent valves of this type may be bulky and take up a relatively large amount of construction space.

The document EP 2 008 857 A1 describes, for example, a fuel tank for a motor vehicle, with a vent valve which has a valve housing and a vent opening and is inserted in an upper opening in the tank and protrudes into the interior of the tank and in which a wall opening passes through the wall of the valve housing. A float which is movable between an inoperative position and a closed position is located in the valve housing.

BRIEF SUMMARY OF THE DISCLOSURE

The invention is based on the object of specifying a vent valve in which tilting of a float is prevented and which can be realized with little construction space.

This object is achieved by the subject matter with the features according to the independent claim. Advantageous embodiments are subject matter of the dependent claims, the description and the figures.

According to one aspect, the object is achieved by a vent valve with a vent opening for venting a liquid tank in a motor vehicle, with a float in a float chamber for closing the vent opening; and guide ribs for guiding the float in the float chamber, which guide ribs are formed by a housing of the float chamber and protrude into the interior of the float chamber. This achieves, for example, the technical advantage that a compactly constructed vent valve is realized and the construction space required for the vent valve can be reduced. The float is guided with little play and with little frictional resistance, and therefore a rapid response behaviour of the vent valve is achieved.

In an advantageous embodiment of the vent valve, the float comprises a cup-shaped float body. This achieves, for example, the technical advantage that the float is formed with little consumption of material.

In a further advantageous embodiment of the vent valve, the guide ribs bear against an outside of the cup-shaped float body. This achieves, for example, the technical advantage that a stable guidance of the float is obtained.

In a further advantageous embodiment of the vent valve, the guide ribs bear against an inside of the cup-shaped float body. This achieves, for example, the technical advantage that the construction space of the vent valve is further reduced.

In a further advantageous embodiment of the vent valve, the float comprises an encircling border section for supporting the float on the guide ribs. This achieves, for example, the technical advantage that the float is not only guided by the guide ribs, but is also held in a certain position.

In a further advantageous embodiment of the vent valve, the guide ribs each comprise a knob for reducing a supporting surface of the float on the guide ribs. This achieves, for example, the technical advantage that the ease with which the float moves is improved and blocking of the float is avoided.

In a further advantageous embodiment of the vent valve, the knob is formed from an elastic material. This achieves, for example, the technical advantage that movement noises of the float are reduced.

In a further advantageous embodiment of the vent valve, the guide ribs are formed by walls protruding vertically into the float chamber. This achieves, for example, the technical advantage that not only is the float guided by the guide ribs, but also the housing stability is improved.

In a further advantageous embodiment of the vent valve, the guide ribs are of wedge-shape design with a demoulding slope. This achieves, for example, the technical advantage that the housing can be produced in a simple manner by means of an injection moulding die.

In a further advantageous embodiment of the vent valve, the guide ribs extend from a bottom side of the float chamber. This achieves, for example, the technical advantage that the float can be guided on an inner surface.

In a further advantageous embodiment of the vent valve, the guide ribs have a point or rounded portion on a guide edge for reducing a contact surface. This achieves, for example, the technical advantage that the ease with which the float moves is increased and adhesion forces which may be produced by adhering liquid are reduced.

In a further advantageous embodiment of the vent valve, the guide ribs run along a direction of flow during the filling of the float chamber. This achieves, for example, the technical advantage that the float can react rapidly to a rising liquid level.

In a further advantageous embodiment of the vent valve, a flow plate with a throughflow opening for breaking up a liquid jet entering the float chamber is arranged between the guide ribs. This achieves, for example, the technical advantage that the float is not actuated by an impulse from an entering flow of liquid.

In a further advantageous embodiment of the vent valve, a mounting edge for the mounting of the float is formed in the guide ribs. This achieves, for example, the technical advantage that the float is additionally stabilized in an open position.

In a further advantageous embodiment of the vent valve, the guide ribs are formed integrally with the housing. This achieves, for example, the technical advantage that the housing stability is improved and the guide ribs can be produced together with the housing in one working step.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

Exemplary embodiments of the invention are illustrated in the drawings and are described in more detail below.

BRIEF DESCRIPTION OF THE DRAWINGS

In the drawings:

FIGS. 2A to 2D show a plurality of cross-sectional views of the vent valve;

FIGS. 4A to 4D show a plurality of cross-sectional views of the further vent valve; and FIGS. 5A to 5C show a plurality of bottom views of different vent valves.

DETAILED DESCRIPTION

It is to be understood that both the foregoing general description and the following detailed description are exemplary and explanatory only, and are intended to provide an explanation of various embodiments of the present teachings.

Figure 1:
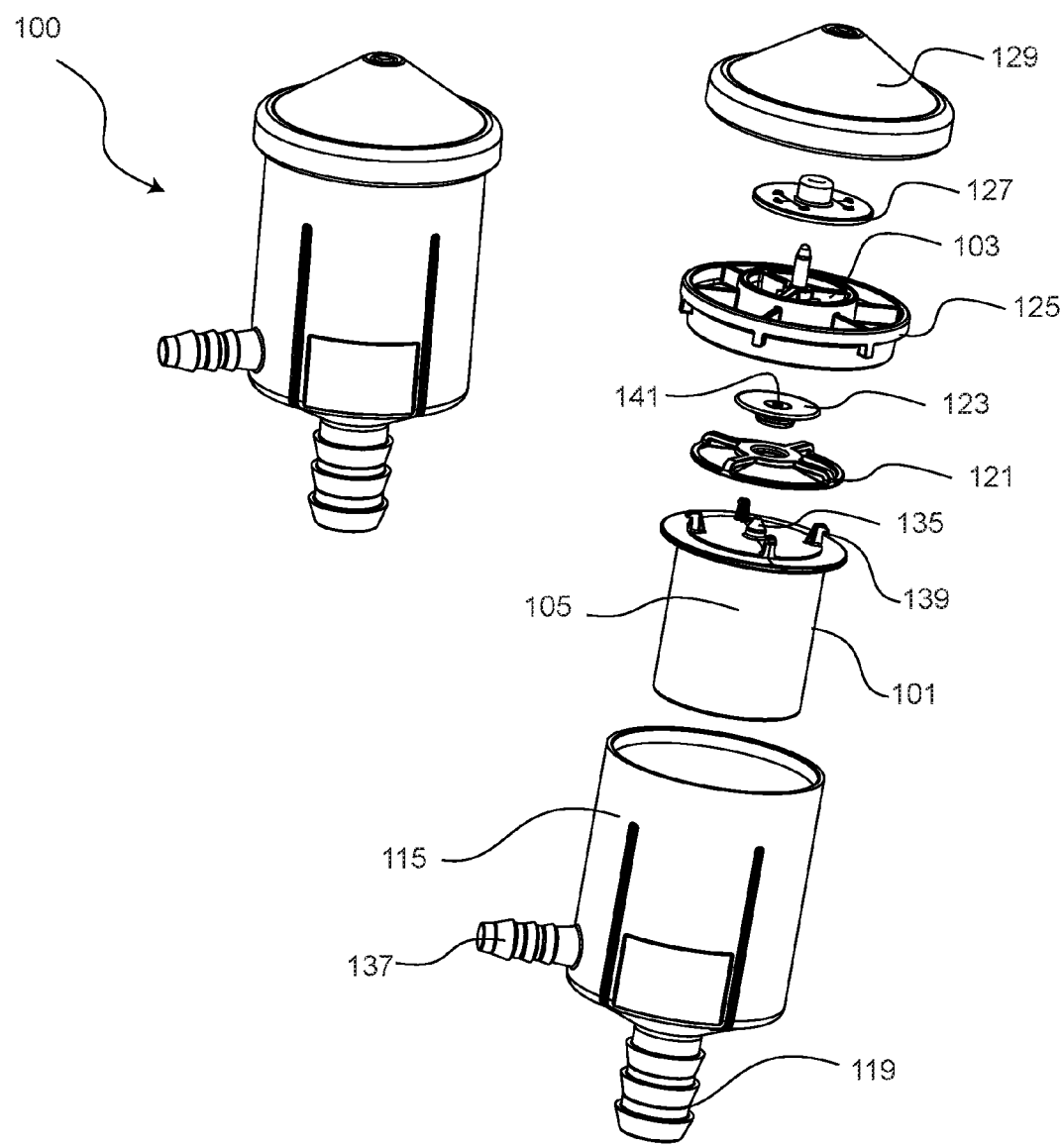
FIG. 1 shows a perspective view and an exploded view of the vent valve.

FIG. 1 shows a perspective view and an exploded view of the vent valve 100. The vent valve 100 is inserted in the tank vent line. The vent valve 100 makes it possible, in the event of positive pressure, for example arising because of refilling or air pressure differences, for the volume of gas being displaced to escape in a defined manner from the liquid tank. Furthermore, a switching off/ending of an automatic fuel pump nozzle unit at a defined filling quantity is brought about by the vent valve 100.

During the refilling of a liquid tank, the air in the liquid tank is displaced by the inserted liquid. If the liquid tank is filled with a high filling rate, of, for example, 40 l/min, the displaced air flows substantially at the same rate out of the liquid tank. In order to permit the respective filling rate, the vent valve 100 is intended to be designed for the filling rate used.

The vent valve 100 comprises a cup-shaped housing 115 in which a connector is formed as a line connection 119 for feeding liquid out of the liquid tank to the vent valve, and a secondary connector 137 for a further exchange of air, for example when refilling the liquid tank with a cylinder screwed thereon. During the regular refilling of the liquid tank, liquid enters the vent valve 100 via a liquid line connected to the line connection 119. The housing 115 forms a cylindrical float chamber 107 in the interior. The advantage achieved by the line connection 119 is that the vent valve 100 can be used outside the liquid tank. Damage or functional impairment of the vent valve 100 by liquid moving in the liquid tank can thereby be prevented.

In the interior of the vent valve 100 there is a float 101 with a float body 105 which closes a vent opening 103 when the liquid enters the vent valve 100. By this means, a first valve is realized in the interior of the vent valve 100.

The float body 105 is likewise of cup-shape design and is located in the interior of the vent valve 100. By means of the downwardly open cup shape, an air lock which allows the float body 105 to float upwards and presses against the vent opening 103 is formed in the interior of the float body 105 on entry of liquid. In this case, no more air escapes out of the vent valve 100 via the vent opening 103.

If the liquid level in the interior of the vent valve 100 drops, the float 101 moves downwards again and releases the vent opening 103. In this case, the air can escape again out of the vent valve 100 via the vent opening 103. During the refilling, the air displaced by the liquid in the interior of the tank exits until liquid enters the liquid line which leads to the vent valve 100 and brings the float 101 into the closed position.

A float seal 123 for sealing the vent opening 103 is arranged on the upper side of the float 101. The float seal 123 is of plate-like design and is composed of an elastic material, such as, for example, silicone. In the closed position, the float seal 123 is placed against the opposite border surface of the vent opening 103 and closes the vent opening 103 in such a manner that air cannot escape from the vent valve 100.

The float seal 123 is fastened to the float body 105 via a seal carrier 121. The seal carrier 121 has a central round insertion opening into which the float seal 123 is inserted. For this purpose, the plate-like float seal 123 has a bead-shaped bulge which is pressed into the insertion opening. For the fastening of the seal carrier 121, four fastening arms 139 which engage in the seal carrier 121 are formed on the upper side of the float body 105. The fastening arms 139 here are designed in such a manner that the seal carrier 121 has a certain amount of play in relation to the float body 105 and can move freely within the play.

The play brings about a movement clearance, which extends in the longitudinal direction, of the seal carrier 121 with the float seal 123. A seal opening 141 for letting air out of or into the float chamber 107 is formed in the centre of the float seal 123. Opposite the seal opening 141, a spike 135 is formed on the upper side of the float body 105. In the closed position, the spike 135 is pressed onto the seal opening 141, thus preventing air from exiting.

If the liquid level in the float chamber 107 drops, the float body 105 also drops downwards because of its own weight if there is no defined positive pressure in the float housing. In the process, because of the play of the seal carrier 121, the spike 135 is first of all moved away from the seal opening 141, and therefore the seal opening 141 is opened up and air can pass through the seal opening 141. This makes it possible to dissipate a positive pressure in the float chamber 107 that would possibly prevent the vent valve 100 from opening again.

On further sinking of the float body 105, the float seal 123 together with the seal carrier 121 is then moved downward such that the vent opening 103 is completely opened up again. This configuration makes it possible to prevent the float 101 from remaining in the closed position.

The cylindrical float body 105 of the float 101 is guided movably in the interior of the float chamber 107 with the aid of a plurality of guide ribs which are formed by a housing 115 of the float chamber 107 and protrude into the interior of the float chamber 107. The guide ribs assist the movement of the float body 105.

The vent opening 103 is formed in a circular sealing plate 125. The sealing plate 125 is placed from above onto the housing 115 and welded such that the float chamber 107 is closed. The float chamber 107 is thereby sealed off in relation to atmospheric pressure.

In order to increase the stability of the sealing plate 125, the latter has a number of reinforcing struts. The reinforcing struts extend on the outside of the sealing plate 125 and run radially between the vent opening 103 and an outer border of the sealing plate 125.

The outside of the vent opening 103 is covered by an elastic diaphragm 127. Air can escape from the vent valve 100 via the elastic diaphragm 127 in the event of a positive pressure. In this case, the plate border or outer border of the elastic diaphragm 127 is lifted upward such that the escaping air escapes through the gap between the diaphragm 127 and the sealing plate 125. If there is no positive pressure in the interior of the valve, the outer edge of the diaphragm 127 rests on the sealing plate 125. As a result, the interior of the valve is sealed off in relation to the outside environment, and therefore there is no permanent exchange of air with the ambient air. By this means, a second valve is realized in the interior of the vent valve 100.

In the event of a negative pressure, the closing diaphragm 127 makes an opening towards the interior of the valve possible by additionally integrated air slots. In this case, the ambient air flows into the interior of the valve via the air slots through the diaphragm 127 resting on the sealing plate 125. The air slots in the elastic diaphragm 127 are designed in such a manner that said air slots are closed when the pressure between the interior of the valve and the environment is equalized. By this means, an exchange of air with the interior of the valve is reduced to a minimum, and therefore drying out and an associated crystallization of urea are prevented.

The construction of the vent valve 100 is therefore designed in such a manner that a supply of air via slots in the diaphragm 127 is likewise realized for a negative pressure in the liquid tank. This permits an additional valve effect. In addition, an entry of contaminants or dirt particles into the vent opening 103 can be prevented.

The elastic diaphragm 127 is placed on a spike which protrudes outwards from the centre of the vent opening 103. By this means, lateral slipping of the elastic diaphragm 127 can be prevented. In a liquid tank which is filled with an aqueous urea solution, a crystallization of urea can be prevented throughout the vent valve 100 by means of the diaphragm 127. The prevention of the formation of crystals permits a trouble-free functioning of the vent valve 100.

A protective cap 129 for further prevention of the penetration of dirt particles into the vent opening 103 is arranged above the sealing plate 125. The protective cap 129 latches on the sealing plate 125 and, in the process, at the same time secures the elastic diaphragm 127.

The strong individual parts from which the vent valve 100 is produced, such as, for example, the housing 115, the float body 105, the seal carrier 121, the sealing plate 125 or the protective cap 129, are moulded parts made from plastic. Said moulded parts can be produced, for example, from polyamide (PA), polyoxymethylene (POM), polyolefin or olefin-based thermoplastic elastomers (TPO) by injection moulding. The manufacturing of the individual components of the vent valve 100 from said materials is particularly advantageous since this results in a high strength and stability of the vent valve 100.

FIG. 2A shows a cross-sectional view of the vent valve 100 with an opened vent opening 103 in an open position. The float 101 is in a lower position, and therefore the float seal 123 opens up the vent opening 103 and air can escape out of the vent opening 103. Owing to the wide opening of the vent opening 103, the venting can also take place at a high rate of, for example, 40 l/min. The air displaced out of the liquid tank enters the float chamber 107 via the line connection 119 and is guided around the float 101 before said air then exits from the vent opening 103. Ventilation is therefore ensured via the elastic diaphragm 127.

The float 101 comprises an encircling border section 111 for supporting the float 101 on the guide ribs 109. In the open position, the float 101 rests on the guide ribs 109. In order to permit easy release from the open position, individual elevations are formed as supporting points for the float body 105 on the guide ribs 109. Said elevations prevent extensive resting of the float body 105 on the guide ribs 109. The spotwise support on the supporting points achieves the advantage that the float body 105 is prevented from freezing up or fixedly crystallizing on the guide ribs 109.

FIG. 2B shows a cross-sectional view of the vent valve 100 with a closed vent opening 103. After liquid enters via the line connection 109, the liquid level in the float chamber 107 increases and the float 101 is lifted into the closed position and closes the vent opening 103 in relation to the atmospheric pressure by means of the float seal 123. In this case, air and liquid cannot exit from the vent valve 100.

In the closed position, the float seal 123 arranged on the float body 105 closes the vent opening 103. In addition, the spike 135 of the float body 105 closes the seal opening 141 of the float seal 123. The float chamber 107 is sealed off towards the outside and an exit of liquid is prevented. This subsequently brings about the switching off or ending of the tanking operation and the liquid tank is filled.

FIG. 2C shows a cross-sectional view of the vent valve 100 with a closed float seal 123, in which the seal opening 141 in the float seal 123 has been opened up. After the liquid level in the float chamber 107 drops, the float 101 moves downwards. In the process, the spike 135 of the float body 105 first of all opens up the central seal opening 141 such that air can flow through the seal opening 141 into the interior of the float chamber 107 or out of the float chamber 107. A pressure equalization is thereby achieved, since otherwise the float 101 could remain in the closed position.

After this, on further dropping of the liquid level in the float chamber 107, the float seal 123 then drops downwards from the vent opening 103 such that the latter is opened up and air can flow outwards via the vent opening 103 and the elastic diaphragm 127, for example during renewed refilling of the liquid tank. The pressure between the liquid tank and the atmosphere is again equalized.

FIG. 2D shows a further cross-sectional view of the vent valve 100 with a plurality of web-like guide ribs 109. The guide ribs 109 are formed by walls protruding vertically into the float chamber 107 and serve for guiding the float 101 in the float chamber 107. The guide ribs 109 centre the float 101 in the lateral direction in relation to the inner wall of the housing 115 and permit a guided movement of the float 101 in the longitudinal direction. The guide ribs 109 permit a smooth-running and jam-free movement of the float body 105 in the interior of the vent chamber 107. In addition, the guide ribs 109 form a stop for the float body 105, and therefore the latter comes to stand at a predetermined position during an opening movement.

The five guide ribs 109 are formed by the cross-sectionally circular housing 115 of the float chamber 107 and protrude vertically into the interior of the float chamber 107. The guide ribs 109 extend in the longitudinal direction in the interior of the float chamber 107 and run along a direction of flow during the filling of the float chamber 107 by the line connection 119. The structural strength of the housing 115 can thereby be improved.

The guide ribs 109 bear with a guide edge against the outside of the cup-shaped float body 105. The guide edge comprises a point or rounded portion for reducing the contact surface with the float 101. It is advantageous if the guide ribs 109 are of slightly wedge-shaped design such that a demoulding slope is produced. Owing to the demoulding slope, the housing 115 can be efficiently produced integrally with the guide ribs 109 by means of an injection moulding die. A flow plate 133 is arranged over an inlet of the line connection 119. In general, the number of guide ribs 109 can vary. The number of guide ribs 109 is advantageously between three and five.

Figure 3:
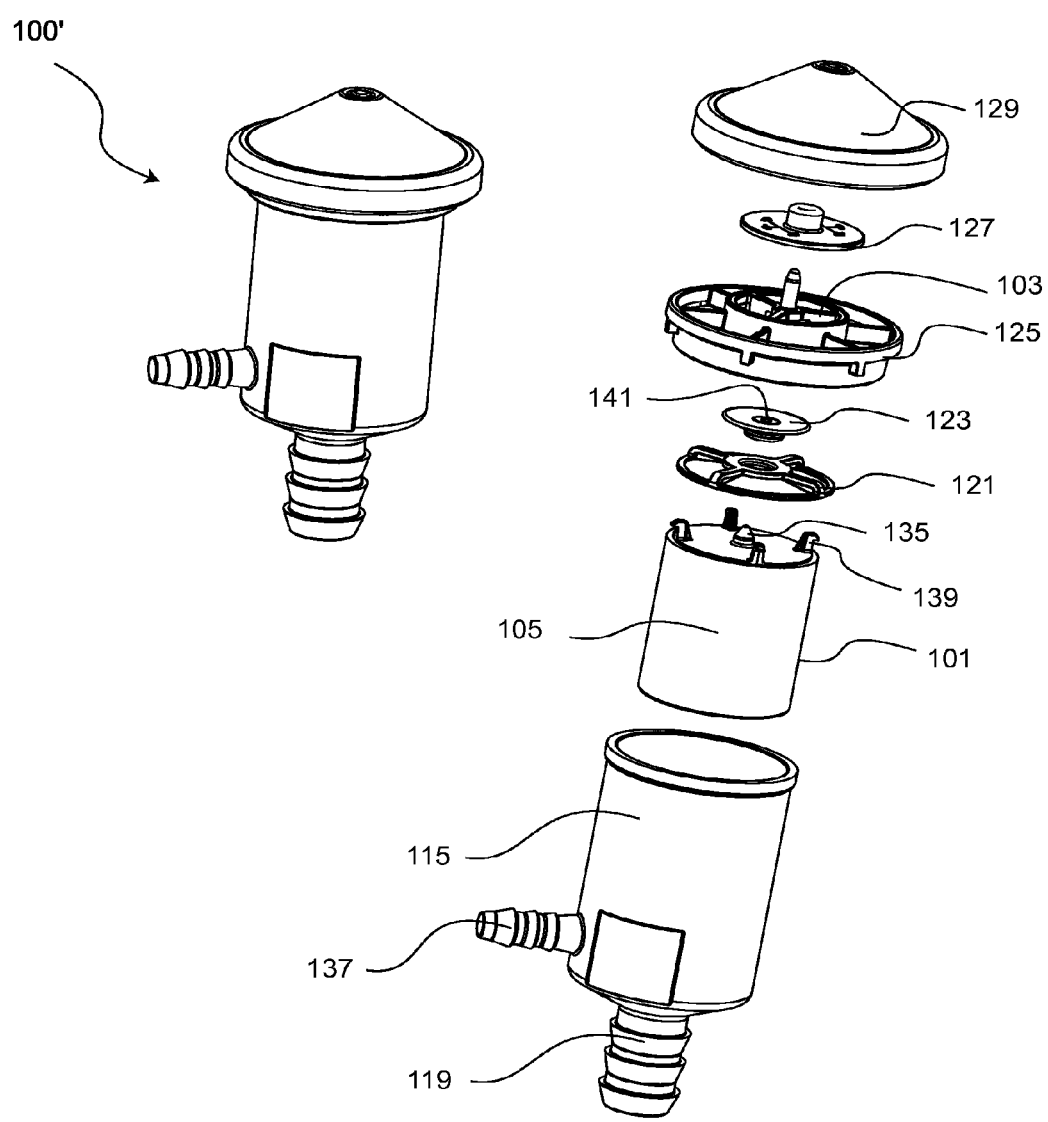
FIG. 3 shows a perspective view and an exploded view of a further vent valve.
Figure 6:
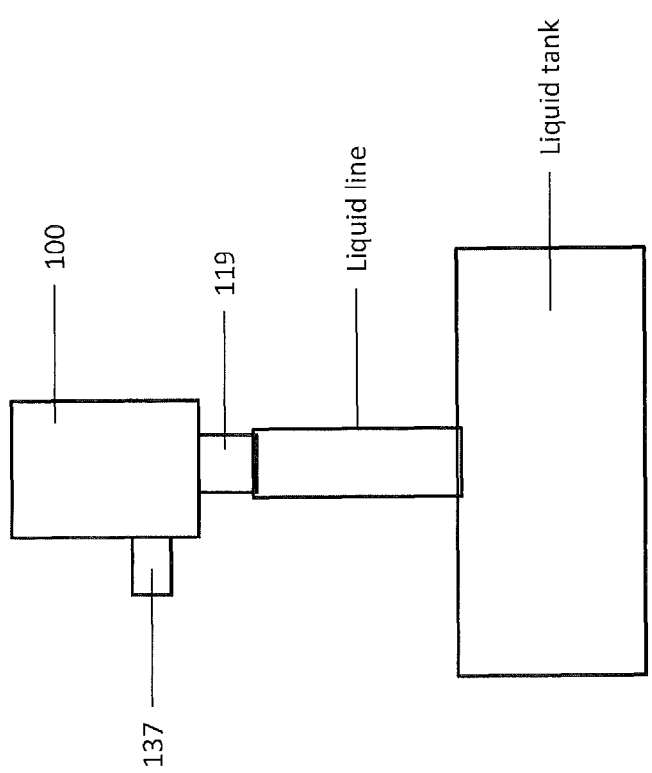
FIG. 6 illustrates an embodiment vent valve disposed outside of a liquid tank and connected thereto with a line connection.

FIG. 3 shows a perspective view and an exploded view of a further vent valve 100'. The manner of operation and the components of the vent valve 100' correspond to those which have been explained in conjunction with FIG. 1, except for the fact that the guide ribs 109' do not protrude into the float chamber from an outer wall of the housing, but rather extend into the interior of the float chamber 107 from the funnel-shaped base of the vent valve 100'. As a result, the vent valve 100' can be made even more compact.

FIGS. 4A to 4C show a plurality of cross-sectional views of the vent valve 100' from FIG. 3 in different opening states of the float 101 that correspond to those from FIGS. 2A to 2D. However, the guide ribs 109' extend from a bottom side 113 of the float chamber 107 and bear against the inside of the cup-shaped float body 105. A respective knob or an elevation 117 is formed on the upper side of the guide ribs 109' in order to reduce a supporting surface of the float 101 on the guide ribs 109'. The knobs 107 can be formed from an elastic material, and therefore noises when the float 101 strikes against the guide ribs 109' are reduced. The knobs 117 as a float support can be produced by injection moulding by means of a two-component technique, and therefore a combination of hard and soft materials is produced. In addition, the float 101 can likewise be produced from a soft plastic in order to dampen noises.

FIG. 4D shows a further cross-sectional view of the vent valve 100' with a plurality of web-like guide ribs 109' which are formed by walls. The guide ribs 109' likewise run along a direction of flow during the filling of the float chamber 107, centre the float 101 in the lateral direction in relation to the inner wall of the housing 115 and permit a guided movement of the float 101 in the longitudinal direction.

The five guide ribs 109' extend in a star-shaped manner from the centre of the cylindrical float chamber 107 and bear with the guide edges against the inside of the cup-shaped float body 105. The guide edges likewise have a point or rounded portion for reducing a contact surface with the float 101. In general, the number of guide ribs 109' can vary. The number of guide ribs 109' is advantageously between three and five.

FIGS. 5A to 5C show a plurality of bottom views of vent valves 100 with different flow plates 133. The flow plate 133 serves for breaking up a liquid jet entering the float chamber 107. This prevents the entering liquid jet from striking directly against the float body 105 and, by means of its mechanical impulse, from moving said float body into the closed position. The flow plate 133 is located below the float 101 and is likewise formed by the housing 115 of the float chamber 107.

In FIG. 5A, the flow plate 133 has a concentric shape which is connected to the border of an inlet opening in the line connection 119. Throughflow openings 131 which are in the shape of arcs of a circle and through which the liquid passes in a braked manner are formed around the flow plate 133. When the liquid penetrates said throughflow openings, the latter ensure a calmer flow to the float 101. This arrangement of the throughflow openings 131 has the effect that liquid primarily enters the float chamber 107 in the region of the wall of the line section 119. This is advantageous since the liquid has a lower flow velocity in the region of the wall of the line connection 119. There is no throughflow opening in the centre of the flow plate 133, and therefore a direct striking of the liquid jet against the float body 105 is prevented.

In FIG. 5B, the flow plate 133 has a cross-shaped throughflow opening 131 through which the liquid passes likewise in a braked manner. The cross-shaped throughflow opening 131 particularly effectively breaks up the liquid jet.

In FIG. 5C, the flow plate 133 has two central throughflow openings 131-1 in the shape of a partial segment and two openings 131-2 which are in the shape of arcs of a circle and run in the region of the wall of the line connection 119.

From the foregoing description, those skilled in the art can appreciate that the present teachings can be implemented in a variety of forms. Therefore, while these teachings have been described in connection with particular embodiments and examples thereof, the true scope of the present teachings should not be so limited.

Various changes and modifications may be made without departing from the scope of the teachings herein.

All of the features explained and shown in conjunction with individual embodiments of the invention can be provided in a different combination in the subject matter according to the invention in order at the same time to realize the advantageous effects thereof.

The scope of protection of the present invention is provided by the claims and is not limited by the features explained in the description or shown in the figures.

The invention claimed is:

1. Vent valve with a vent opening capable of venting a liquid tank in a motor vehicle, with:
   a line connection for feeding liquid out of the liquid tank into the vent valve, wherein the line connection is connected to the liquid tank by a liquid line, and wherein the vent valve is located outside the liquid tank,
   a float, having a cup-shaped float body, in a float chamber capable of closing the vent opening;
   guide ribs capable of guiding the float in the float chamber, which guide ribs are formed as part of a housing of the float chamber and protrude into an interior of the float chamber, wherein the guide ribs are immovable in respect to the housing of the float chamber, wherein the guide ribs bear against an inside of a cup-shaped float body;
   wherein the guide ribs extend continuously from a bottom side of the float chamber;
   wherein the guide ribs have a rounded portion on a guide edge for reducing a contact surface; and
   wherein the guide ribs each comprise a knob capable of reducing a supporting surface of the float on the guide ribs, wherein the knob bears against the inside of the cup-shaped float body.

2. Vent valve of claim 1, wherein the knob is formed from an elastic material.

3. Vent valve of claim 1, wherein the guide ribs run along a direction of flow during a filling of the float chamber with liquid.

* * * * *